United States Patent
Hoover et al.

(10) Patent No.: US 11,254,202 B2
(45) Date of Patent: Feb. 22, 2022

(54) FUELING SYSTEM AND METHOD OF FUELING

(71) Applicants: VOLVO TRUCK CORPORATION, Gothenburg (SE); Dale Hoover, McConnellsburg, PA (US); Bengt Lassesson, Gothenburg (SE)

(72) Inventors: Dale Hoover, McConnellsburg, PA (US); Bengt Lassesson, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 68 days.

(21) Appl. No.: 16/643,728

(22) PCT Filed: Oct. 26, 2017

(86) PCT No.: PCT/US2017/058508
§ 371 (c)(1),
(2) Date: Mar. 2, 2020

(87) PCT Pub. No.: WO2019/083534
PCT Pub. Date: May 2, 2019

(65) Prior Publication Data
US 2020/0398659 A1    Dec. 24, 2020

(51) Int. Cl.
*B60K 15/04* (2006.01)
*B60K 15/03* (2006.01)
(Continued)

(52) U.S. Cl.
CPC ........ *B60K 15/03006* (2013.01); *B60K 15/03* (2013.01); *B60K 15/04* (2013.01);
(Continued)

(58) Field of Classification Search
CPC .. B60K 15/03; B60K 15/03006; B60K 15/04; B60K 2015/03131; B60K 2015/03203;
(Continued)

(56) References Cited

U.S. PATENT DOCUMENTS

| 6,253,802 B1 * | 7/2001 | Enge | B60K 15/03519 |
| | | | 123/518 |
| 6,289,947 B1 * | 9/2001 | Heimbrodt | B60K 15/035 |
| | | | 141/128 |

(Continued)

FOREIGN PATENT DOCUMENTS

| DE | 19738198 A1 | 3/1999 |
| EP | 3224076 | 10/2017 |

(Continued)

OTHER PUBLICATIONS

International Search Report (dated Jan. 9, 2018) for corresponding International App. PCT/US2017/058608.

(Continued)

*Primary Examiner* — Nicolas A Arnett
(74) *Attorney, Agent, or Firm* — WRB-IP LLP (57) ABSTRACT

A fueling system for an engine includes a fuel tank, a controller, a fuel nozzle receptacle connected to the fuel tank, the fuel nozzle receptacle including a receptacle sensor configured to send a signal to the contoller indicative of whether a fuel nozzle of a fuel dispenser is received in the fuel nozzle receptacle, and an electric fill slop valve between the fuel tank and the fuel nozzle receptacle, the electric fill stop valve being, configured to be controlled to open and close in response to a signal from the controller. The controller can be configured to receive at least one of (a) a signal whether a fuel nozzle of a fuel dispenser is received in a fuel nozzle receptacle connected to the fuel tank, and (b) a signal whether a fuel level of the fuel tank is full, and to control the electric fill stop valve to close when a signal is (Continued)

sent to the controller that at least one of (a) the fuel nozzle is not received in the fuel nozzle receptacle when the controller is configured to receive the signal whether the fuel nozzle of a fuel dispenser is received in the fuel nozzle receptacle, and (b) the fuel level of the fuel tank is full when the controller is configured to receive the signal whether the fuel level of the fuel tank is full.

39 Claims, 4 Drawing Sheets

(51) Int. Cl.
| | | |
|---|---|---|
| *F02M 37/00* | (2006.01) | |
| *F02M 37/20* | (2006.01) | |
| *F02M 25/08* | (2006.01) | |

(52) U.S. Cl.
CPC ...... *F02M 25/089* (2013.01); *F02M 37/0076* (2013.01); *F02M 37/0088* (2013.01); *F02M 37/20* (2013.01); *B60K 2015/03019* (2013.01); *B60K 2015/0319* (2013.01); *B60K 2015/0323* (2013.01); *B60K 2015/03131* (2013.01); *B60K 2015/03203* (2013.01); *B60K 2015/03217* (2013.01); *B60K 2015/03302* (2013.01); *B60K 2015/049* (2013.01); *B60K 2015/0458* (2013.01)

(58) Field of Classification Search
CPC .... B60K 2015/049; B60K 2015/03019; B60K 2015/0319; B60K 2015/03217; B60K 2015/0323; B60K 2015/03302; B60K 2015/0458; F02M 37/20; F02M 37/0088; F02M 37/0076; F02M 25/089
See application file for complete search history.

(56) References Cited

U.S. PATENT DOCUMENTS

| | | | |
|---|---|---|---|
| 6,352,176 B1 | 3/2002 | Hartsell, Jr. et al. | |
| 6,854,492 B2* | 2/2005 | Benjey | B60K 15/03519 141/198 |
| 6,877,488 B2* | 4/2005 | Washeleski | B60K 15/03504 123/41.31 |
| 6,918,416 B2* | 7/2005 | Aschoff | B60K 15/03519 141/302 |
| 7,055,543 B2* | 6/2006 | Erickson | F02D 33/003 123/514 |
| 7,296,600 B2* | 11/2007 | Ferreria | F02M 25/0836 141/302 |
| 7,350,604 B2* | 4/2008 | Veenstra | F17C 13/025 180/69.4 |
| 7,866,356 B2* | 1/2011 | Benjey | B67D 7/0476 141/198 |
| 8,522,834 B2* | 9/2013 | Okawachi | F17C 5/00 141/95 |
| 9,834,430 B2* | 12/2017 | Oriel | B67D 7/362 |
| 10,443,546 B2* | 10/2019 | Yudanov | B67D 7/0401 |
| 10,549,979 B2* | 2/2020 | Furmanczyk | B67D 7/02 |
| 10,562,390 B2* | 2/2020 | Eulitz | F01N 3/2066 |
| 10,994,604 B2* | 5/2021 | Wolf | B60K 15/03519 |
| 11,014,445 B2* | 5/2021 | Hoover | B60K 15/035 |
| 2001/0025668 A1* | 10/2001 | Enge | B60K 15/03519 141/59 |
| 2006/0011164 A1 | 1/2006 | Kropinski et al. | |
| 2006/0287804 A1* | 12/2006 | Takayanagi | F02M 25/089 701/112 |
| 2009/0078239 A1 | 3/2009 | Hill et al. | |
| 2009/0107580 A1 | 4/2009 | Enge et al. | |
| 2013/0013183 A1 | 1/2013 | Surnilla et al. | |
| 2016/0017823 A1 | 1/2016 | Sloan et al. | |
| 2016/0082832 A1 | 3/2016 | Dudar et al. | |
| 2018/0272861 A1* | 9/2018 | Miura | B67D 7/048 |

FOREIGN PATENT DOCUMENTS

| | | |
|---|---|---|
| WO | 2006087376 A1 | 8/2006 |
| WO | 2008017756 A2 | 2/2008 |
| WO | 2016085370 A1 | 6/2016 |

OTHER PUBLICATIONS

European Search Report (dated Feb. 19, 2021) far corresponding European App. EP 17 92 9527.

* cited by examiner

FUELING SYSTEM AND METHOD OF FUELING

BACKGROUND AND SUMMARY

The present invention relates to a fueling system and a method of fueling, particularly suited for engines, more particularly for engines of vehicles, and still more particularly suited for pressurized fueling systems.

There is substantial interest in ground transportation vehicles using low vapor pressure fuel in a liquid phase. Low vapor pressure fuel is normally a gas at atmospheric pressure, but will become a liquid when subjected to a pressure above atmospheric. Such fuel may be any low vapor pressure fuel, such as, for example, Propane or Dimethyl Ether (DME).

It is important to be able to fill fuel tank(s) on vehicles to a safe and proper fuel level, and it is important to prevent dangerous over-filling or nuisance under-filling of the tanks. Nuisance under-filling may occur in multiple tanks arrangements when a dispenser senses a backpressure in the fuel line and shuts off because a first tank has filled before another tank. It is also desirable to provide various safety features in connection with fueling systems for such fuels because of dangers associated with leaks or spills. For example, the inventors recognize that it is desirable to automatically turn off the vehicle engine once a fueling nozzle is inserted in a vehicle fueling system and before fueling can begin in case the operator does not shut the engine off. This can avoid possible problems such as improper filling of fuel tanks due to irregularities in tank pressure due to operation, or the operator failing to remove a fuel dispenser's fueling nozzle from the vehicle before driving off.

Conventional fueling systems for low vapor pressure fuel use a mechanical float-driven am to close a valve (fill stop valve) between the fuel nozzle receptacle and the fuel tank when the float arm reaches the defined full tank level. This type of fill stop valve is subject to many failure modes. For example, the float arm vibrates due to the motion of the fuel in the tank sloshing back and forth and up and down both during driving and when fuel is introduced into the tank during filling. In addition, when the fuel level is below the lower extension of the arm, the float arm may vibrate due to the motion of the truck. This continuous vibration reduces the life expectancy of dynamic seals in the fill stop valves due to back-and-forth wear resulting in eventual leakages. The wear on the seals also weakens the seals and those seals may rupture when the tanks are being filled under pressure. Any leakage and/or rupture in the fill stop valve can allow fuel to continue to flow into the tank and over-fill it to an unsafe level.

Liquid pressurized fuel tanks need to be filled such that, when they are considered to be full, there is a vapor head space in the tank to allow for the liquid's thermal expansion. Without sufficient vapor head space, high hydrostatic pressure of the expanding liquid due to increasing temperature could cause the metal tank to rupture, allowing the release of pressurized fuel and metal fragments. These fuel tanks would normally be protected with over-pressure relief valves which would discharge the high pressure fuel to the ambient environment to prevent rupturing. The rapid discharge of flammable fuel to the immediate environment prevents tank ruptures, but can still pose a potential flammable condition to occur.

Filling multiple tanks on a vehicle from a common filling point (nozzle receptacle) increases the likelihood of over-filling and/or rapid discharge of fuel. When filling multiple tanks the dispenser will typically not shut off until the dispenser unit senses that the back pressure increases (pressure monitoring) or the flow of the liquid decreases (flow monitoring) due to the backpressure increase. In a system where there are multiple tanks, say, two tanks, if the first tank reaches the full level (fill stop valve closes) and the second tank is still filing, the dispenser would not shut off due to the second tank's flow, and fuel leaking past the first tank's fill stop valve would allow the first tank to continue to fill to a possible over full condition.

It is also possible that, due to similar wear on the fill stop valves of both tanks, leakage flow around the seals would be sufficient to allow the dispenser to over fill both tanks. Since the vehicle is typically turned "off" during fueling, there would be no indication that the tanks are over full. The fuel dispenser may not shut off until both tanks are over full. The person filling the tanks could manually check the fuel levels using an external tank fuel level gauge, assuming one is available. Upon starting the vehicle, the fuel level would indicate the fill level, and the vehicle would indicate to the operator that the fuel tank(s) are over filled. If the tanks are over filled, it is necessary to rely on the operator to drain the tanks to a safe level before operating the vehicle. Failing to prevent over filling the tanks could lead to an uncontrolled fuel release. In order to safely drain over filled tanks, other issues are presented such as additional equipment being required and safety risks associated with properly transferring fuel back to a supply tank.

It is desirable to provide a fueling system and method for addressing the foregoing issues.

In accordance with an aspect of the invention, a fueling system for an engine is provided and comprises a fuel tank, a controller, and an electric fill stop valve in the fuel tank, the electric fill stop valve being configured to be controlled to open and close in response to a signal from the controller. The controller is configured to receive at least one of (a) a signal whether a fuel nozzle of a fuel dispenser is received in a fuel nozzle receptacle connected to the fuel tank, and (b) a signal whether a fuel level of the fuel tank is full, and to control the electric fill stop valve to close when a signal is sent to the controller that at least one of (a) the fuel nozzle is not received in the fuel nozzle receptacle when the controller is configured to receive the signal whether the fuel nozzle of a fuel dispenser is received in the fuel nozzle receptacle, and (b) the fuel level of the fuel tank is full when the controller is configured to receive the signal whether the fuel level of the fuel tank is full.

In accordance with another aspect of the invention, a method is provided for fueling a fuel system for an engine, the fuel system comprising a fuel tank, a controller, and an electric fill stop valve on the fuel tank, the electric fill stop valve being configured to be controlled to open and close in response to a signal from the controller. The method comprises sending a close signal to the controller when at least one of a fuel nozzle is not received in the fuel nozzle receptacle, and a fuel level in the fuel tank is full, and controlling, via the controller, the electric fill stop valve to close when the close signal is sent to the controller.

Fueling systems and methods according to aspects of the invention offer various advantages including facilitating ensuring that a nozzle of a dispenser is properly connected to a fuel nozzle receptacle of the fueling system before the fill stop valve control is enabled. Further, by providing an electric fill stop valve, wear on the fill stop valve can be minimized because the fill stop valve seals will not lend wear due to the opening and closing due to vibrations or sloshing of fuel as with valves that are float operated.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
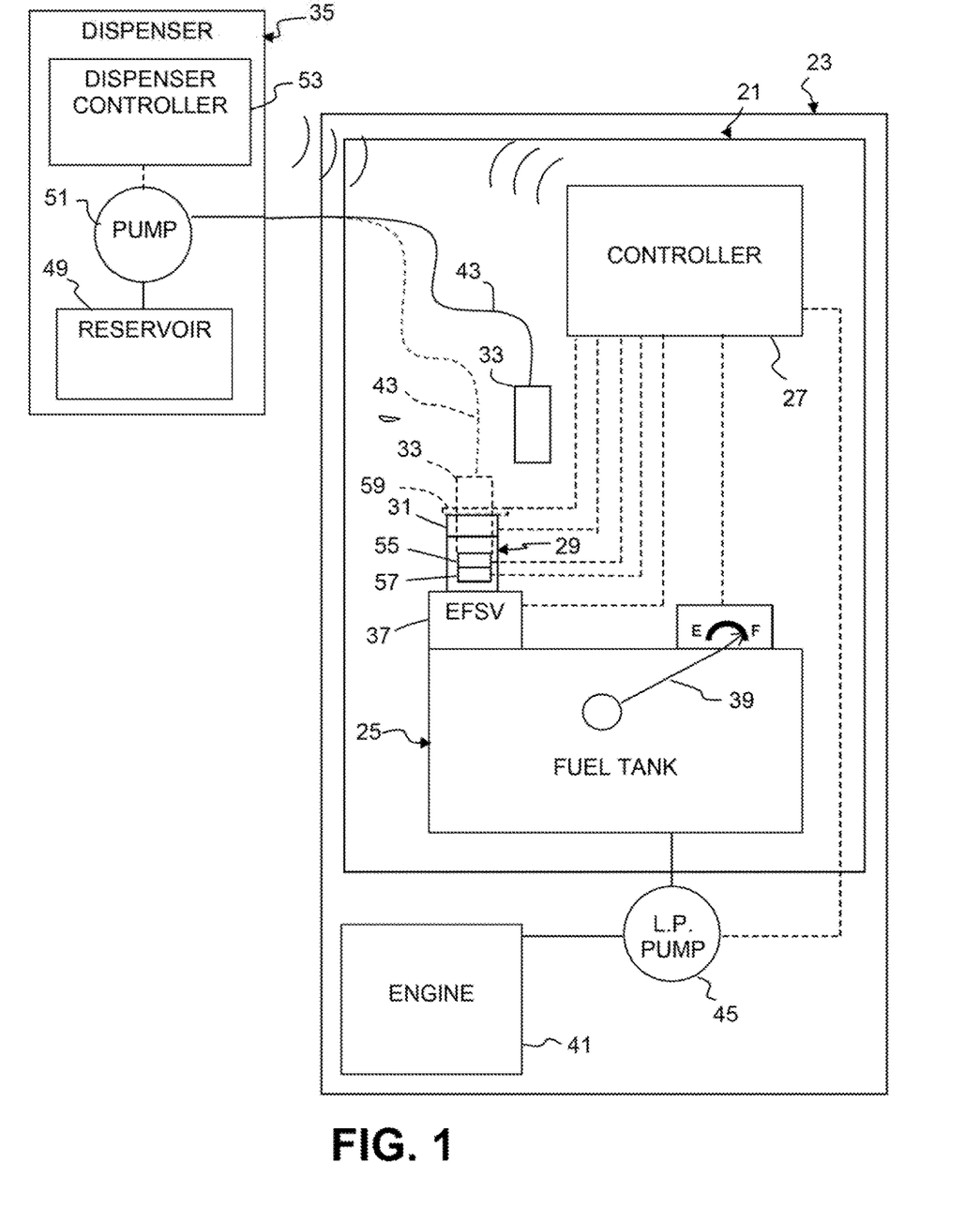
FIG. 1 is a schematic view of a vehicle including a fueling system according to an aspect of the present invention.

A fueling system 21 for an engine 41 of a vehicle 23 is shown in FIG. 1 and comprises a fuel tank 25 on the vehicle. The fueling system 21 further comprises a controller 27 (such as an engine control unit (ECU) or a dedicated Fuel Control Unit (FCU)), which can be remote from the vehicle but in the illustrated embodiment is shown as part of the vehicle. The inventive fueling system 21 is particularly adapted for use with a pressurized fuel system, however, the invention also has applicability to unpressurized fuel systems.

The fueling system 21 further comprises a fuel nozzle receptacle 29 connected to the fuel tank 25, the fuel nozzle receptacle including a receptacle sensor 31 configured to send a signal to the controller 27 indicative of whether a fuel nozzle 33 of a fuel dispenser 35 is received in the fuel nozzle receptacle. The receptacle sensor 31 can be in the form of a switch that is closed (or opened) when the fuel nozzle 33 (shown in phantom in FIG. 1) is properly seated in the fuel nozzle receptacle 29 and that is opened (or closed) when the fuel nozzle is not received or not properly seated in the fuel nozzle receptacle (shown by solid lines in FIG. 1). The signal from the receptacle sensor 31 to the controller indicating that the fuel nozzle 33 is received in the fuel nozzle receptacle can result from closing (or opening) a circuit, and the signal from the receptacle sensor to the controller indicating that no fuel nozzle is received (or properly received) in the fuel nozzle receptacle can result from opening (or closing) a circuit. It will be appreciated that the signals between components discussed herein may take a variety of forms not limited to those specifically discussed.

The interface between the fuel nozzle 33 and the fuel nozzle receptacle 29 will ordinarily include either a magnet or plunger on the nozzle and an electrical switch on the fuel nozzle receptacle that can be either mechanically operated or magnetically operated. A mechanically operated switch might be activated by a plunger on the nozzle 33 and a magnetically operated switch might be a mechanical switch such as a reed switch or an electronic device such as a Hall Effect switch. It would also be possible to use structures such as a proximity sensor that would detect the presence of the metal nozzle. With a proximity sensor, nothing else would be required to be mounted on the nozzle. The foregoing structures for sensing a nozzle 33 are merely illustrative and not limiting. The sensor will preferably, but not necessarily, be an electrical sensor that will detect a properly attached fuel nozzle. The switch may be operated by suitable means such as near field communication, such as via use of RFID tap.

The fueling system 21 further includes an electric fill stop valve 37 (EFSV in FIGS. 1 and 2) between the fuel tank 25 and the fuel nozzle receptacle 29, the electric fill stop valve being configured to be controlled to open and close in response to a signal from the controller 27. The electric fill stop valve 37 is typically a valve having an electrically controlled actuator. The signal from the controller 27 to the electric fill stop valve 37 to open may result from closing (or opening) a circuit, and the signal from the controller to the electric fill stop valve to close may result from opening (or closing) a circuit. Some means (not shown) for closing the conduit upstream of the electric fill stop valve 37 is ordinarily provided, such as a removable cap, such as the cap 59 shown in phantom in FIG. 1, which can facilitate, among other things, maintaining pressure in pressurized systems. A mechanical float am (not shown) may also be provided to operate the electric fill stop valve or a separate backup fill stop valve (not shown) for a redundant safety feature.

The electric fill stop valve can be a normally closed valve (i.e. closed when not energized and open when energized) or a normally open valve (i.e. open when not energized and closed when energized). A normally open electric fill stop valve can perform similarly to a mechanical float arm fill stop valve.

Various techniques can be provided to prevent filling of the tank (including an already full tank) having a normally open electric fill stop valve when the key is "off", such as by providing an electronic locking mechanism on the fuel nozzle receptacle that is configured to prevent a fuel dispenser nozzle from being connected to the fuel nozzle receptacle. The locking mechanism is turned "off" when the key is in the "on" position so that fill related functions can be performed and the engine and non-fill related functions are "off" allowing fueling to occur. The locking mechanism is turned "on" when the key is in the "off" position, i.e., engine off and fill related and non-fill related functions are off. It takes power to energize the locking mechanism to allow fueling. The locking mechanism may, for example, simply lock a protective cap 59 (shown in phantom in FIG. 1), linked to the controller 27, on the fuel nozzle receptacle 29. For example, the controller 27 might control a solenoid (not shown) so that a pin that is movably attached to the nozzle receptacle 29 and moved by the solenoid is received in a mating hole in a cap 59 that has threads that mate with threads on the nozzle receptacle 29 when the engine or non-fill related functions are "on" and/or the key is in the "off" position so that the cap cannot be unscrewed from the nozzle receptacle, and so that the pin is removed from the mating hole when the key is "on" and the engine and non-fill related functions are "off" so that the cap can be unscrewed from the nozzle receptacle. Such a locking mechanism can provide an added benefit of reducing the risk of tampering with fuel in the tank. Such a locking mechanism may also be provided with a normally closed electric fill stop valve.

A normally "closed" electric fill stop valve can be used as an alternative to a normally open electric fill stop valve, however, it will ordinarily be desirable in the implementation of such a normally closed electric fill stop valve to also provide means for dealing with fuel trapped between the tanks' fill stop valves and the filling nozzle after filling, such as a leakage path into the tank to allow the trapped fuel to bleed off. This alternative path could be a simple pressure relief valve in parallel with the electronic fill stop valve to relieve pressure build up in the lines between the fueling receptacle and the tank's fill stop valve. The pressure relief valve would only open at pressures higher than the dispenser filling pressure. On multiple tank systems, each tank could have a similar configuration of valves for safe redundancy.

Normally Closed Electric Fill Stop Valve

In an aspect of the invention wherein the electric fill stop valve 37 is normally closed, the controller 27 is configured to control the normally closed electric fill stop valve to close when the receptacle sensor 31 sends a signal to the controller that the fuel nozzle 33 is not received in the fuel nozzle receptacle 29. In this way, when a fuel nozzle 33 is removed from the fuel nozzle receptacle 29, the normally closed electric fill stop valve 37 will automatically close.

The controller 27 can also be configured to permit the normally closed electric fill stop valve 37 to open when the receptacle sensor 31 sends a signal to the controller that the fuel nozzle 33 is received in the fuel nozzle receptacle 29 (where, here, "permit" is used in the sense that the received signal satisfies one condition of at least one condition and potentially multiple conditions that must be satisfied for the controller to control the normally closed electric fill stop valve to open). In this way, when a fuel nozzle 33 is inserted into the fuel nozzle receptacle 29, the normally closed electric fill stop valve 37 may be opened, however, this will ordinarily only occur if other conditions are also met. For example, if a fuel level sensor 39 sends a signal to the controller 27 that the fuel level in the fuel tank 25 is full, then the controller 31 can control the normally closed electric fill stop valve 37 to lose or remain closed if not already open, even if the fuel nozzle 33 is received in the fuel nozzle receptacle 29. If the fuel level sensor 39 sends a signal to the controller 27 that the fuel level in the fuel tank 25 is less than full, then the controller 31 can control the normally closed electric fill stop valve 37 to open or remain open for fueling, as long as the fuel nozzle 33 is detected as received in the fuel nozzle receptacle 29 by the receptacle sensor 31.

The fuel level sensor 39 can be any suitable device configured to sense a fuel level in the fuel tank 25 and to send a signal to the controller 27 indicative of whether the fuel level is full. A suitable fuel level sensor 39 can include a float that pivots on an arm or that rises and falls in a cylinder and, when the fuel level is full, closes a circuit so that a signal can be sent to the controller 27. The controller 27 is ordinarily configured to control the normally closed electric fill stop valve 37 to close in response to a signal from the fuel level sensor 39, which signal may be in the form of closing (or opening) a circuit, that the fuel level in the fuel tank is full. The controller 27 is also ordinarily configured to permit the normally closed electric fill stop valve 37 to open when the fuel level sensor 39 sends a signal to the controller 27 indicating that the fuel level in the fuel tank 25 is below full, such as by opening (or closing) a circuit (where, here, "permit" is used in the sense that the below full signal satisfies one condition of at least one condition and potentially multiple conditions that must be satisfied for the controller to control the normally closed electric fill stop valve to open). Typically, the controller 27 is configured to control the normally closed electric fill stop valve 37 to open only when (a) the receptacle sensor 31 sends a signal to the controller 27 that the fuel nozzle 33 is received in the fuel nozzle receptacle 29 and (b) the fuel level sensor 39 sends a signal to the controller indicating that the fuel level in the fuel tank 25 is below full.

The controller 27 will ordinarily be configured to prevent operation of non-fill related functions of the engine 41 and vehicle 23 when the receptacle sensor 31 sends the signal to the controller that the fuel nozzle 33 is received in the fuel nozzle receptacle 29. The controller 27 will also ordinarily be configured to stop operation of non-fill related functions of the engine 41 and vehicle 23 when the receptacle sensor 31 sends the signal to the controller that the fuel nozzle 33 is received in the fuel nozzle receptacle 29. The controller 27 can also be configured to automatically turn the engine 41 off before filling can begin, in the event that an operator fails to turn off the engine after stopping to fill the fuel tanks. "Fill-related" functions that remain operable during fueling include providing power to the controller 27, monitoring of fuel level by the fuel level sensor 39, monitoring of whether the nozzle 33 is received in the fuel nozzle receptacle 29 by the receptacle sensor 31, and control of the normally closed electric fill stop valve 37. Other functions can be "fill-related" if desired, such as functions related to safety during a filling operation. For example, a fill-related function might include automatic application of brakes of a vehicle during a filling operation so that the vehicle cannot move during filling.

The controller 27 can be configured to allow operation of non-fill related functions of the engine 41 and vehicle 23 only when the receptacle sensor 31 sends the signal to the controller that the fuel nozzle 33 is not received in the fuel nozzle receptacle 29. This configuration would also prevent the vehicle 23 from driving away (prevents the engine from starting) with the dispenser hose 43 connected.

Further, the controller 27 can be configured to control the normally closed electric ill stop valve 37 to close in response to detection of performance of a non-fill related function, although, preferably, non-fill related functions will be disabled when the receptacle sensor detects the presence of a fuel nozzle 33 properly received in the fuel nozzle receptacle 29. Further, the controller 27 can be configured to prevent fueling, such as by keeping the normally closed electric fill stop valve 37 closed, if the vehicle's 23 engine 41 is cranked to a running condition while the fuel nozzle is inserted in the vehicle's fuel nozzle receptacle 29.

Many pressurized fuel systems require a low pressure fuel pump 45 or other activity to turn "on" at key "on" to begin to fill and pressurize the fuel lines to the engine 41 in preparation for starting the engine. The low pressure fuel pump may be internal or external to the fuel tanks. During this filling phase, it is typically not desired to have non-essential functions operating. The controller 27 can be controlled to prevent turning on those non-essential functions that are turned off upon detection of the fuel nozzle 33 in the fuel nozzle receptacle 29 that would be typically turned on at key "on" until after the fuel lines are properly pressurized.

Figure 2:
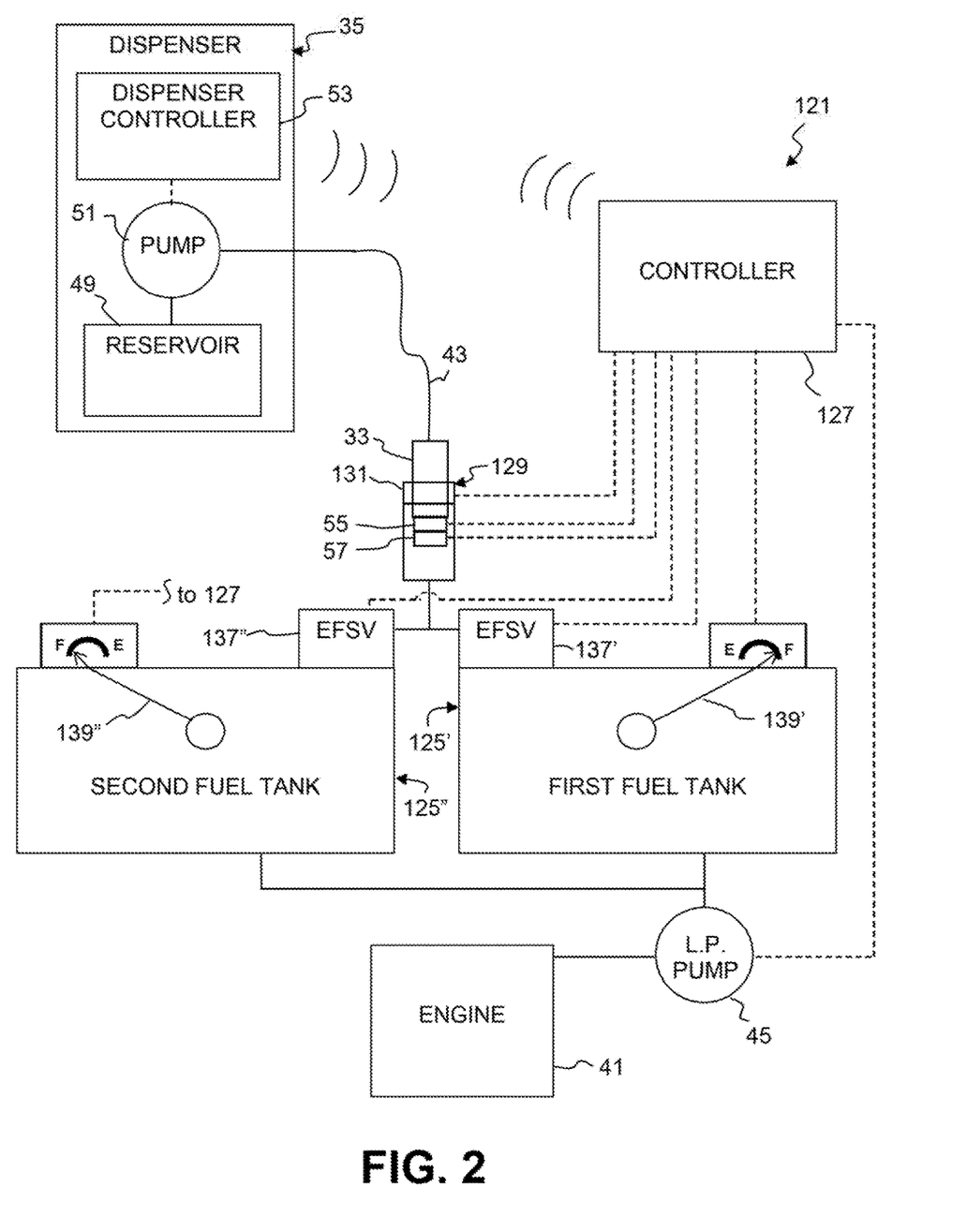
FIG. 2 is a schematic view of a fueling system according to another aspect of the present invention.

FIG. 2 shows another embodiment of a fueling system 121 with multiple fuel tanks. The fueling system 121 can have all of the features discussed with respect to the fueling system 21 described in connection with FIG. 1, but further comprises, in addition to a first fuel tank 125' that can have the features of the fuel tank 25, a second fuel 125" tank. The second fuel tank 125" typically has substantially the same features as the first fuel tank 125'. The fueling system 121 further comprises a first normally closed electric fill stop valve 137' for the first fuel tank and a second normally closed electric fill stop valve 137" between the second fuel tank 125" and the fuel nozzle receptacle 129. Like the first normally closed electric fill stop valve 137', the second normally closed electric fill stop valve 137' is configured to be controlled to open and close in response to a signal from the controller 127.

The normally closed electric fill stop valves 137' and 137" can be controlled by the controller 127 to open and close depending upon, for example, whether the receptacle sensor 131 in the fuel nozzle receptacle 129 senses the presence of a properly received fuel nozzle 33, whether a fuel level sensor 139' in the rust fuel tank or fuel level sensor 139" in the second fuel tank detects that the fuel level in the associated tank is or is not full. Typically, the controller 127 is configured to permit the first normally closed electric fill stop valve 137' and the second normally closed electric fill stop valve 137" to open when the receptacle sensor 131 sends a signal to the controller that the fuel nozzle 33 is received in the fuel nozzle receptacle 129 (where, here, "permit" is used in the sense that the nozzle received signal satisfies one condition of at least one condition and potentially multiple conditions that must be satisfied for the controller to control the first and second normally closed electric fill stop valves to open). The first and second normally closed electric fill stop valves will typically open only as long as other conditions, in addition to the nozzle received signal, are met, such as that the fuel level sensors 139' and 139" do not sense that the fuel level in their respective fuel tanks are full, and typically as long as other non-fill related functions are turned off.

The fueling system 121 typically includes the first fuel level sensor 139' configured to sense the first fuel level in the first fuel tank 125' and to send a signal to the controller 127 indicative of whether the first fuel level is full, and the second fuel level sensor 139" configured to sense the second fuel level in the second fuel tank 125" and to send a signal to the controller indicative of whether the second fuel level is full. The controller 127 is configured to control the first normally closed electric fill stop valve 137' to close in response to a signal from the first fuel level sensor 139' that the first fuel level is full, and to control the second normally closed electric fill stop valve 137" to close in response to a signal from the second fuel level sensor 139" that the second fuel level is full.

As with the fueling system 21, in the fueling system 121 the controller 127 is typically configured to permit the first normally closed electric fill stop valve 137' to open when the first fuel level sensor 139" sends a signal to the controller indicating that the first fuel level is below full, and to permit the second normally closed electric fill stop valve 137" to open when the second fuel level sensor 139" sends a signal to the controller indicating that the second fuel level is below full (where "permit" is used in the sense that a signal that the first fuel level is below full satisfies one condition of at least one and potentially multiple conditions that must be satisfied for the controller to control the first normally closed electric fill stop valve to open, and a signal that the second fuel level is below full satisfies one condition of at least one and potentially multiple conditions that must be satisfied for the controller to control the second normally closed electric fill stop valve to open). The controller 127 is typically configured to control the normally closed electric fill stop valve 137' to open when multiple conditions are satisfied, including (a) the receptacle sensor 131 sends a signal to the controller that the fuel nozzle 33 is received in the fuel nozzle receptacle 129 and (b) the first fuel level sensor 139' sends a signal to the controller indicating that the first fuel level is below full. The controller 127 is typically also configured to control the second normally closed electric fill stop valve 137" to open when multiple conditions are met, including (a) the receptacle sensor 131 sends a signal to the controller that the fuel nozzle 33 is received in the fuel nozzle receptacle 129 and (b) the second fuel level sensor 139" sends a signal to the controller indicating that the second fuel level is below full.

Fueling systems with more than two tanks can also be provided and will have substantially the same features as the fueling systems with two tanks.

Returning to FIG. 1, the fueling system 21 may further be considered to comprise a fuel dispenser 35 comprising a fuel reservoir 49, a conduit or dispenser hose 43, the fuel nozzle 33, and means for providing fuel, such as a pump S for pumping fuel or a valve for allowing flow of sufficiently pressurized fuel from the reservoir through the conduit and to the fuel nozzle. The invention will be described in connection with an embodiment using a pump 51, however, it will be appreciated that the fuel providing means may include other structures such as a valve for allowing or preventing flow from a pressurized reservoir. The fuel dispenser 35 can comprise a dispenser controller 53 that can be but is not necessarily configured to communicate with the controller 27. Ordinarily, communication between the controller 27 and the dispenser controller 53 will be wireless, however, wired communication could be also provided. The controller 27 can be configured to send a do-not-dispense signal to the dispenser controller 53 when the receptacle sensor 31 sends a signal to the controller that the fuel nozzle 33 is not received in the fuel nozzle receptacle 29, and the dispenser controller 53 can be configured to prevent the pump 51 from pumping fuel upon receipt of the do-not-dispense signal. Signals sent to the controller 27 to control the dispenser 35 can, of course, be sent directly to the dispenser controller 53, however, it is presently believed that a less complicated system will involve at least those signals associated with the fuel level and the fuel nozzle receptacle being sent to the controller and, from the controller, to the dispenser controller.

The controller 27 may further be configured to permit the normally closed electric fill stop valve 37 to open when the receptacle sensor 31 sends a signal to the controller that the fuel nozzle is received in the fuel nozzle receptacle 29 (where "permit" is used in the sense that the nozzle received signal satisfies one condition of at least one condition and potentially multiple conditions that must be satisfied for the controller to control the normally closed electric fill stop valve to open), as well as being configured to send a dispensing-permitted signal to the dispenser controller 53 when the receptacle sensor sends a signal to the controller that the fuel nozzle is received in the fuel nozzle receptacle (where receipt of the dispensing-permitted signal by the dispenser controller satisfies one condition of at least one condition and potentially multiple conditions that must be satisfied for the dispenser controller to control the dispenser to dispense fuel), or when the fuel nozzle is received in the fuel nozzle receptacle, together with other conditions being met, such as fuel level in the fuel tank 25 being below full, non-fill related functions being turned off, etc. The dispenser controller 53 can be configured to control the pump 51 to pump fuel only upon receipt of the dispensing permitted signal. If the communication between the engine or vehicle and the dispenser is unavailable, the dispenser will not pump fuel into the fuel tanks. This safety feature prevents the dispenser from over filling the tanks when the engine's or vehicle's key is "off" and the fill stop valve is open.

A pressure sensor 55 can be provided for sensing pressure in the fuel nozzle 33 and sending a pressure signal to the dispenser controller 53. The dispenser controller 53 can be configured to control the pump 51 to adjust an amount of fuel pumped in response to the pressure signal. For example, when pressure measured at the pressure sensor 55 rises above a predetermined level, which may be indicative of a blockage or other obstruction, the pump 51 can be controlled by the dispenser controller 53 to pump fuel at a lower rate than when pressure is below that level. Similarly, when pressure measured at the pressure sensor 55 falls below a predetermined level, which may be indicative of a leak or other problem, the pump S can be controlled by the dispenser controller 53 to pump fuel at a lower rate than when pressure is above that level, or stop pumping fuel altogether. The signal from the pressure sensor 55 can be sent to the controller 27 and from there to the dispenser controller, or directly to the dispenser controller.

In addition to or in lieu of a pressure sensor 55, a flow sensor 57 can be provided for sensing a fluid flow rate in the fuel nozzle 33 and sending a fluid flow rate signal to the dispenser controller 53. The dispenser controller 53 can be configured to control the pump 51 to adjust an amount of fuel pumped in response to the fluid flow rate signal. For example, if the flow sensor 57 sends a signal that the flow rate at the fuel nozzle has fallen below a predetermined rate, which may be indicative of a blockage or other obstruction, the pump 51 can be controlled by the dispenser controller 53 to pump fuel at a lower rate than when the flow rate is above that level. Similarly, when the flow rate at the fuel nozzle rises above a predetermined rate, which may be indicative of a leak or other problem, the pump 51 can be controlled by the dispenser controller 53 to pump fuel at a lower rate than when the flow rate is below that level, or stop pumping fuel altogether. The signal from the flow sensor 57 can be sent to the controller 27 and from there to the dispenser controller, or directly to the dispenser controller.

Providing a pressure sensor 55 and/or a flow sensor 57 is particularly useful in a fueling system 121 with multiple fuel tanks 125' and 125". In such a fueling system, typically, one tank will fill before the other tank during fueling. This may occur for any number of reasons, such as that one tank may be closer to the fuel nozzle 33, one tank may have had more fuel in it at the start of fueling, or because of differences in the complexity of flow paths from the fuel nozzle receptacle to the tanks. While each fuel tank 125' and 125" will ordinarily be fueled via respective lines branched off from a common line, it is also possible that the fuel tanks may be arranged in series so that one tank will only fill after the first one is filled.

However the multiple fuel tanks 125' and 125" are arranged in a particular fueling system 121, when one tank ills before the other tank, it will typically be desirable to reduce the rate at which fuel is pumped into the fueling system to avoid excessive backpressure in the fueling system which may cause problems such as over-pressuring seals on the electric fill stop valves 137' or 137". Thus, detecting increased pressure via a pressure sensor 55 and/or decreased flow via the flow sensor 57 may be indicative of the fact that, e.g., the first fuel tank 125' is full and the first electric stop fill valve 137' has shut, and that it is desirable to decrease the rate at which fuel is pumped to the second fuel tank 125". The pressure sensor 55 and/or the flow sensor 57 can send a signal to the controller 127 that can then send a signal to the dispenser controller 53, or they can send a signal directly to the dispenser controller. Such an arrangement can also be useful for avoiding nuisance under-filling that might occur when a dispenser shuts down because. e.g., a backpressure is sensed.

The fuel nozzle receptacle 29 typically includes a valve (not shown), which may be spring actuated, that automatically opens when a nozzle 33 is inserted into the fuel nozzle receptacle and closes when the nozzle is removed. The controller 27 can also be configured to open the normally closed electric fill stop valve 37 after removal of the nozzle 33 from the fuel nozzle receptacle 29 for a period of time sufficient to allow liquid fuel trapped in fill path lines between the valve of the fuel nozzle receptacle 29 and the normally closed electric fill stop valve to vaporize into the fuel tank 25 so that any danger that the lines will burst due to expansion of the trapped liquid is reduced.

Figure 3:
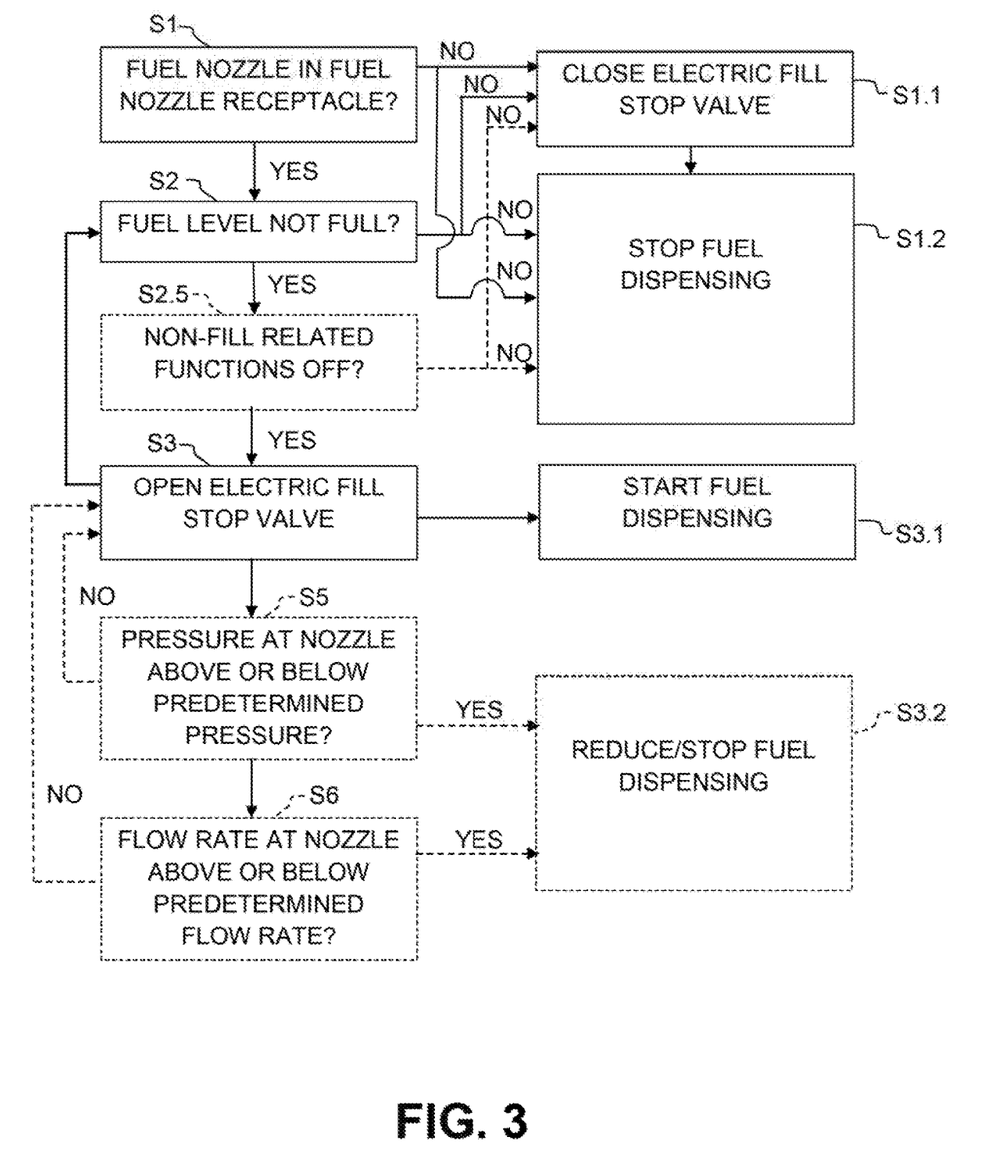
FIG. 3 is a flow chart illustrating a method of fueling involving a normally closed electric fill stop valve according to an aspect of the present invention.

A method can be provided for fueling a pressurized fuel system 21 in an engine 41 of a vehicle 23 and is illustrated in FIG. 3. Except where otherwise indicated, the method shall be described in connection with a fueling system 21 for an engine 41 of a vehicle 23 as described in FIG. 1, wherein the fueling system comprises a fuel tank 25, a controller 27, a fuel nozzle receptacle 29 connected to the fuel tank, the fuel nozzle receptacle including a receptacle sensor 31 configured to send a signal to the controller indicative of whether a fuel nozzle of a fuel dispenser is received in the fuel nozzle receptacle, and a normally closed electric fill stop valve 37 between the fuel tank and the fuel nozzle receptacle, the normally closed electric fill stop valve being configured to be controlled to open and close in response to a signal from the controller. It will be appreciated that the method is applicable to fueling systems, engines, and vehicles having multiple fuel tanks.

According to the method, at step S1, if a not-received signal is sent to the controller 27, via the receptacle sensor 31, indicating that the fuel nozzle 33 is not received in the fuel nozzle receptacle 29, then the normally closed electric fill stop valve 37 is controlled, via the controller, to close at step S1.1 when the receptacle sensor sends the not-received signal to the controller.

If, at step S1, a received signal is sent, via the receptacle sensor 31, to the controller 27 indicating that the fuel nozzle 33 is received in the fuel nozzle receptacle 29, the controller permits (but does not necessarily control) the normally closed electric fill stop valve 37 to open (where "permit" is used in the sense that the received signal satisfies one condition of at least one condition and potentially multiple conditions that must be satisfied for the controller to control the normally closed electric fill stop valve to open). The controller 27 may be configured to control the normally closed electric fill stop valve 37 to open when the receptacle sensor senses the presence of a properly received fuel nozzle 33 in the fuel nozzle receptacle, however, typically this will only occur after other conditions are satisfied. For example, the fuel system 21 may further comprise a fuel level sensor 39 configured to sense a fuel level in the fuel tank 25 and to send a signal to the controller 27 indicative of whether the fuel level is full at step S2, and the method can comprise, at step S1.1, controlling, via the controller, the normally closed electric fill stop valve 37 to close in response to a signal from the fuel level sensor that the fuel level is full. If a received signal is sent to the controller 27 at step S1 indicating that the fuel nozzle 33 is received in the fuel nozzle receptacle 29 and, at step S2, the fuel level sensor 39 sends a not-full signal to the controller indicating that the fuel level is below full, the controller can then send a signal to the normally closed electric fill stop valve 37 to open at step S3 in response to receipt of both the received signal and the not-full signal. Ordinarily, an additional step S2.5 will be included that will involve sending a signal to the controller 27 that all non-fill-related functions are off before the method will move on to step S3 where the controller sends a signal to the electric stop ill valve 37 to open. The fuel level sensor 39 can continue to monitor the fuel level in the fuel tank 25 and, at step S2, send a signal to the controller 27 that the fuel tank is full so that the controller will control the normally closed electric fill stop valve 37 to close, or to send a signal to the controller that the fuel tank is not full so that the controller will control the normally closed electric fill stop valve to remain open.

The fueling system 21 may further be considered to comprise the fuel dispenser 35 comprising the fuel reservoir 49, a conduit or dispenser hose 43, the fuel nozzle 33, and a pump 51 for pumping fuel from the reservoir through the conduit and to the fuel nozzle, and a dispenser controller 53 that can be configured to communicate with the controller 27. At step S1, the controller 27 can be configured to send a do-not-dispense signal to the dispenser controller 53 when the receptacle sensor sends the not-received signal to the controller and, at step S1.2, the dispenser 35 can be controlled by the dispenser controller 53 so that the pump 51 is prevented from pumping fuel upon receipt of the do-not-dispense signal. The dispenser controller 53 may alternatively or in addition receive a signal indicating that the normally closed electric fill stop valve 37 is closed that is used by the dispenser controller to prevent the pump 51 from pumping fuel. At step S2, the fuel level sensor 39 can send a not-full signal to the controller 27 indicating that the fuel level is below full, and (usually provided other conditions are met at step S2.5) at step 3, the controller 27 can control the normally closed electric fill stop valve 37 to open in response to receipt of both the received signal and the not-full signal, and the dispenser controller can, at step S3.1 control the pump 51 to pump fuel upon receipt by the dispenser controller of a signal indicating that the fuel nozzle is received in the fuel nozzle receptacle and that the fuel level is below full. The dispenser controller 53 may also require a signal indicating that the normally closed electric fill stop valve 37 is open. The signal indicating that the fuel nozzle is received in the fuel nozzle receptacle and that the fuel level is below full received by the dispenser controller 53 may be received directly from the receptacle sensor 31 and the fuel level sensor 39 or from the controller 27 that has received such signals from the receptacle sensor and the fuel level sensor.

A signal from any one of the receptacle sensor 31 at step S1 that the nozzle 33 is not properly received in the fuel nozzle receptacle, the fuel level sensor 39 at step S2 that the fuel tank is full (or not "not full"), or that all non-fill related functions are not off at step S2.5 can individually be used to control the normally closed electric fill stop valve 37 to close at step S1.1 and to control the dispenser 35 to not dispense fuel at step S1.2 by the controller 27 sending control signals to the normally closed electric fill stop valve 37 and to the dispenser controller 53. A signal that the normally closed electric fill stop valve 37 is closed or has been instructed to close can alternatively or in addition to the foregoing be used to control the dispenser 35 to not dispense fuel at step S1.2.

Where the fueling system 21 comprises a pressure sensor 55 for sensing pressure in the fuel nozzle 33 and sending a pressure signal indicative of a pressure at the fuel nozzle to the dispenser controller (or the controller 27 and then to the dispenser controller), the method further can further comprise, at step SS, sending the pressure signal to the dispenser controller 53 and, if the dispenser controller determines that pressure is above or below predetermined levels, controlling, at step S3.2, via the dispenser controller, the pump 51 to adjust an amount of fuel pumped in response to the pressure signal, such as by reducing flow pumped by the fuel pump or stopping the fuel pump.

When the fueling system comprises a flow sensor 57 for sensing flow in the fuel nozzle 33 and sending a flow signal indicative of a Dow at the fuel nozzle to the dispenser controller 53 (or to the controller 27 and then to the dispenser controller), the method further can comprise, at step S6, sending the flow signal to the dispenser controller and, if the dispenser controller determines that flow is above or below predetermined levels, controlling, at step S3.2, via the dispenser controller, the pump 51 to adjust an amount of fuel pumped in response to the flow signal, such as by reducing flow pumped by the fuel pump or stopping the fuel pump.

The method described in connection with the fueling system 21 shown in FIG. 1 is equally applicable to fueling systems having multiple fuel tanks as shown in FIG. 2. For example, the fueling dispenser 35 can be controlled to reduce (or, if appropriate) stop flow when a pressure or flow rate signal indicative of one of the tanks being full is received.

Normally Open Electric Fill Stop Valve

The operation of a fueling system including a normally open electric fill stop valve is similar in many respects to the operation of the normally closed electric fill stop valve and can be and is herein also described in connection with the equipment illustrated in FIGS. 1 and 2. Whereas the normally closed electronic fill stop valve will ordinarily be closed except when a nozzle is inserted in the nozzle receptacle and the fuel level is below full (and, optionally, when other conditions are also met), the normally open electronic fill stop valve will be normally open when the fuel level is below full, regardless whether a nozzle is inserted in the nozzle receptacle.

The normally open electronic fill stop valve will ordinarily be open at all times when the fuel tank is not full, however, it may be desirable to configure the system to prevent fueling under certain conditions when the electronic fill stop valve when the tank is not full and the electronic fill stop valve would otherwise be open. For example, it may be desirable to prevent filling of the tank by preventing operation of a dispenser that dispenses fuel through the nozzle when no electrical functions associated with the fueling system are capable of being performed (e.g., the fueling system's electronics are inoperable because the vehicle's key is "off") and the normally open electronic fill stop valve would not be controlled to close when the tank is full.

Various techniques can be provided to prevent filling of the tank (including an already full tank) having a normally open electric fill stop valve when the key is "off", such as by providing an electronic locking mechanism on the fuel nozzle receptacle that is configured to prevent a fuel dispenser nozzle from being connected to the fuel nozzle receptacle. 11e locking mechanism is turned "off" when the key is in the "on" position so that fill related functions can be performed and the engine and non-fill related functions are "off" allowing fueling to occur. The locking mechanism is turned "on" when the key is in the "off" position, i.e., engine off and fill related and non-fill related functions are off. It takes power to energize the locking mechanism to allow fueling. The locking mechanism may, for example, simply lock a protective cap 59 (shown in phantom in FIG. 1), linked to the controller 27, on the fuel nozzle receptacle 29. Such a locking mechanism can provide an added benefit of reducing the risk of tampering with fuel in the tank. Such a locking mechanism may also be provided with a normally closed electric fill stop valve.

As with the aspect of the invention including a normally closed electric fill stop valve, the fueling system 21 including a normally open electric fill stop valve 37 comprises a fuel tank 25, a controller 27, and the normally open normally open electric fill stop valve, typically in (i.e. associated with) the fuel tank. The normally open electric fill stop valve 37 is configured to be controlled to open and close in response to a signal from the controller 27. Except where otherwise indicated, the following description pertaining to operation of a fueling system and method including a normally open electric fill stop valve can pertain to operation of a fueling system and method including a normally closed electric fill stop valve.

In the aspect of the fueling system and method involving the normally open electric fill stop valve 37, the controller is configured to receive a signal whether a fuel level of the fuel tank is full, and to control the normally open electric fill stop valve to close when a signal is sent to the controller that the fuel level of the fuel tank is full when the controller is configured to receive the signal whether the fuel level of the fuel tank is full. The controller 27 will ordinarily also be configured to receive a signal whether the fuel nozzle 33 of the fuel dispenser 35 is received in the fuel nozzle receptacle 29. Whether the controller 27 controls the normally open electric fill stop valve to open when a signal is sent to the controller that the fuel level is not full may also depend on whether the controller receives a signal that the fuel nozzle of a fuel dispenser is received in the fuel nozzle receptacle.

As seen in FIG. 1, the fueling system 21 involving the normally open electric fill stop valve 37 comprises a fuel nozzle receptacle 29 that will ordinarily (but not necessarily) include a receptacle sensor 31 configured to send the signal to the controller 27 whether the fuel nozzle 33 is received in the fuel nozzle receptacle. The controller 27 can be configured to permit the normally open electric fill stop valve 37 to open when the controller receives a signal that the fuel nozzle 33 is received in the fuel nozzle receptacle 29 (where "permit" is used in the sense that the received signal satisfies one condition of at least one condition and potentially multiple conditions that must be satisfied for the controller to control the normally open electric fill stop valve to open).

The fueling system 21 involving the normally open electric fill stop valve 37 comprises a fuel level sensor 39 in the fuel tank 25. The fuel level sensor 39 is configured to sense a fuel level in the fuel tank 25 and to send the signal to the controller 27 whether the fuel level is full. The controller 27 can be configured to control the normally open electric fill stop valve 37 to open when the controller receives a signal that the fuel nozzle 33 is received in the fuel nozzle receptacle 29 and the fuel level sensor 39 sends a signal to the controller indicating that the fuel level is below full, typically only provided other conditions are also met. The controller 27 can be configured to control the normally open electric fill stop valve 37 to close when the controller receives a signal that the fuel nozzle 33 is received in the fuel nozzle receptacle 35 and the fuel level sensor 39 sends a signal to the controller indicating that the fuel level is full. The controller 27 can still further be configured to control the normally open electric fill stop valve 37 to open when the controller receives the signal that the fuel nozzle 33 is not received in the fuel nozzle receptacle 35 and the fuel level sensor 39 sends a signal to the controller indicating that the fuel level is below full.

By contrast, in the fueling system and method involving a normally closed electric fill stop valve, the controller will ordinarily be configured to control the normally closed electric fill stop valve to close whenever the receptacle sensor sends the signal to the controller that the fuel nozzle is not received in the fuel nozzle receptacle, and not only when the fuel level sensor also sends a signal to the controller indicating that the fuel level is full.

As with the fueling system and method involving a normally closed electric fill stop valve, in the fueling system and method involving a normally open electric fill stop valve, the controller 27 can be configured to prevent operation of non-fill related functions of the engine or vehicle when the controller receives a signal that the fuel nozzle 33 is received in the fuel nozzle receptacle 35. More particularly, the controller 27 can be configured to stop operation of non-fill related functions of the engine 41 or vehicle 23 when the controller receives the signal that the fuel nozzle 33 is received in the fuel nozzle receptacle 29. The controller 27 can be configured to allow operation of non-fill related functions of the engine 41 or vehicle 23 only when the controller receives a signal that the fuel nozzle 33 is not received in the fuel nozzle receptacle 29.

As seen in FIG. 2, the system 121 can comprise a first fuel tank 125' and a second fuel tank 125", and a first normally open electric fill stop valve 137' and a second normally open electric ill stop valve 137" between, respectively, the first and second fuel tanks and the fuel nozzle receptacle. The first and second normally open electric fill stop valves 137' and 137" can be configured to be controlled to open and close in response to a signal from the controller 127.

A first fuel level sensor 139' can be configured to sense a first fuel level in the first fuel tank 125' and to send a signal to the controller 127 indicative of whether the first fuel level is full, and a second fuel level sensor 139" can be configured to sense a second fuel level in the second fuel tank 125" and to send a signal to the controller indicative of whether the second fuel level is full. The first fuel level sensor 139' can be configured to send a signal to the controller 127 that the first fuel level is full and the second fuel level sensor 139" can be configured to send a signal to the controller that the second fuel level is full. The controller 127 can be configured to control the first normally open electric fill sop valve 137' to close in response to the signal from the first fuel level sensor 139' that the first fuel level is full, and to control the second normally open electric fill stop valve 137" to close in response to the signal from the second fuel level sensor 139" that the second fuel level is full.

The first fuel level sensor 139' can also be configured to send a signal to the controller 127 that the first fuel level is below full and the second fuel level sensor 139" can be configured to send a signal to the controller that the second fuel level is below full. The controller 127 can be configured to permit (and, typically, to control) the first normally open electric fill stop valve 137' to open when the first fuel level sensor 139' sends the signal to the controller indicating that the first fuel level is below full, and to permit (and, typically, to control) the second normally open electric fill stop valve 137" to open when the second fuel level sensor 139" sends the signal to the controller indicating that the second fuel level is below full (where "permit" is used in the sense that a signal that the first fuel level is below full satisfies one condition of at least one and potentially multiple conditions that must be satisfied for the controller to control the first normally open electric fill stop valve to open, and a signal that the second fuel level is below full satisfies one condition of at least one and potentially multiple conditions that must be satisfied for the controller to control the second normally open electric fill stop valve to open). By contrast, in the fueling system and method involving normally closed first and second electric fill stop valves, the first fuel level sensor will ordinarily be configured to send a signal to the controller that the first fuel level is below full and the second fuel level sensor will ordinarily be configured to send a signal to the controller that the second fuel level is below full, and the controller will be configured to control the normally open electric fill stop valve to open when both (a) the controller receives a signal that the fuel nozzle is received in the fuel nozzle receptacle and (b) the first fuel level sensor sends the signal to the controller indicating that the first fuel level is below full, and to control the second normally open electric fill stop valve to open when both (a) the controller receives the signal that the fuel nozzle is received in the fuel nozzle receptacle and (b) the second fuel level sensor sends the signal to the controller indicating that the second fuel level is below full.

The fueling system 21 involving the normally open electric fill stop valve 37 is particularly useful in connection with a "smart" fuel dispenser. The fuel dispenser 35 can comprise a fuel reservoir 49, a conduit 43, a fuel nozzle 33, and means such as a pump 51 for providing fuel from the reservoir through the conduit and to the fuel nozzle. The fuel dispenser 35 comprises a dispenser controller 53 that can be configured to communicate with the controller 27, the fuel level sensor 39 can be configured to send a signal to the controller 27 that the fuel level is full, and the controller can be configured to send a do-not-dispense signal to the dispenser controller when the controller receives the signal that the fuel level is full. The dispenser controller 53 can be configured to prevent the fuel providing means from providing fuel upon receipt of the do-not-dispense signal. In this way, the risk of pumping fuel into a full tank 25 can be minimized.

Similarly, the fuel level sensor 39 can be configured to send a signal to the controller 27 that the fuel level is below full. The controller 27 can be configured to permit the normally open electric fill stop valve to open when the controller receives the signal that the fuel level is below full (where "permit" is used in the sense that a signal that the fuel level is below full satisfies one condition of at least one and potentially multiple conditions that must be satisfied for the controller to control the normally open electric fill stop valve to open). The controller 27 can be further configured to send a dispensing-permitted signal to the dispenser controller 53 when the receptacle sensor 31 sends a signal to the controller that the fuel nozzle 33 is received in the fuel nozzle receptacle 29, and the dispenser controller can be configured to control the fuel providing means to provide fuel upon receipt of the dispensing permitted signal (where receipt of the dispensing-permitted signal by the dispenser controller satisfies one condition of at least one condition and potentially multiple conditions that must be satisfied for the dispenser controller to control the dispenser to dispense fuel). This arrangement can facilitate ensuring that the tank and dispenser are properly configured for fueling.

Figure 4:
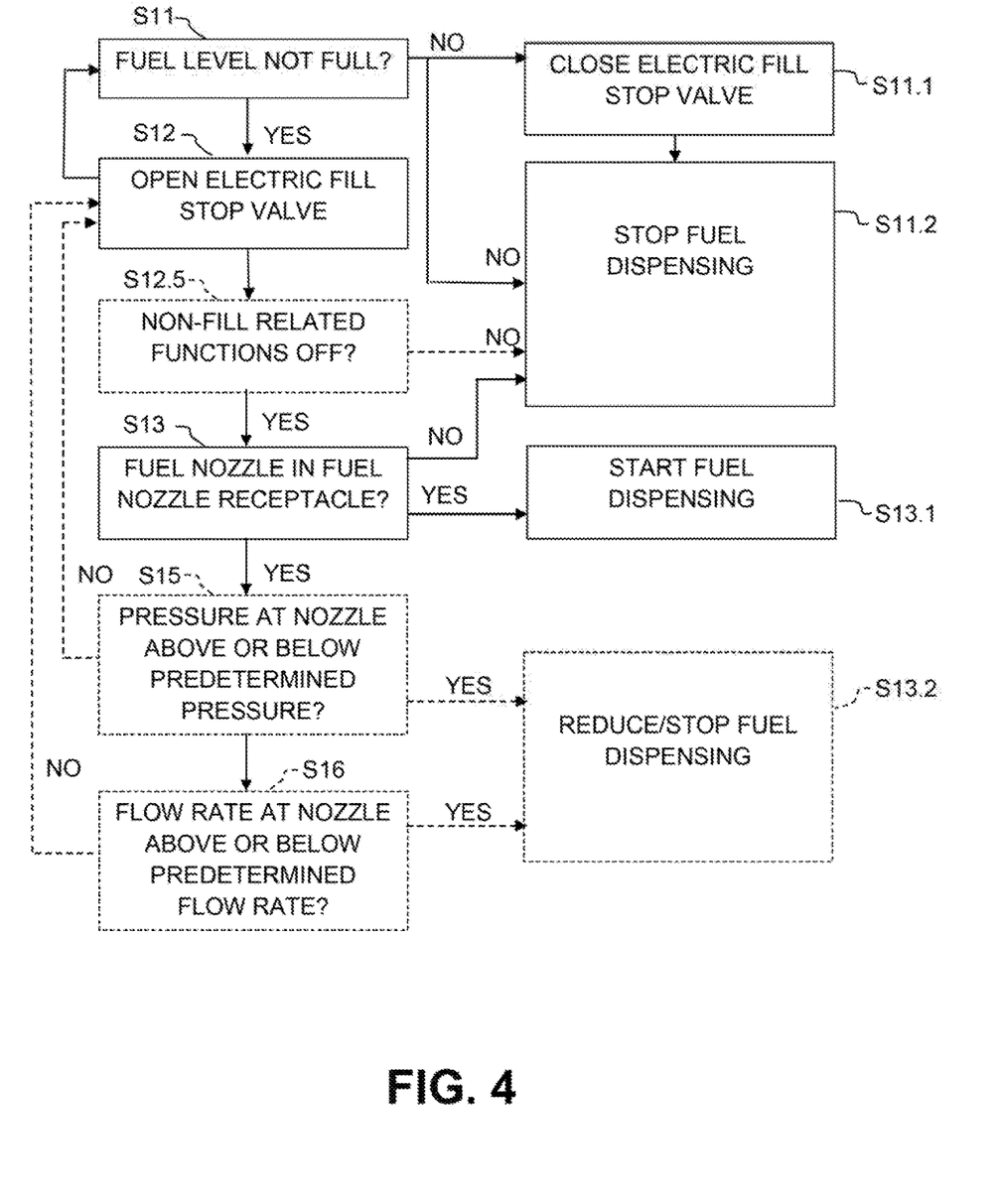
FIG. 4 is a flow chart illustrating a method of fueling involving a normally open electric fill stop valve according to an aspect of the present invention.

A method for fueling a pressurized fuel system 21 having a normally open electric fill stop valve 37 is described in connection with FIG. 4. The engine 41 comprises a fuel tank 25, a controller 27, and a normally open electric fill stop valve 37 on the fuel tank. The normally open electric fill stop valve 37 can be configured to be controlled to open and close in response to a signal from the controller 27.

The fuel system 21 comprises a fuel level sensor 39 configured to sense a fuel level in the fuel tank 25, and the method comprises sending via the fuel level sensor a signal to the controller 27 indicative of whether the fuel level is full. The signal to the controller 27 indicative of whether the fuel level is full can be or is the "close" signal when the fuel level in the fuel tank 25 is full, and the method comprises sending the "close" signal to the controller, and controlling, via the controller, the normally open electric fill stop valve 37 to close at step S11.1 in response to the "close" signal from the fuel level sensor 39 that the fuel level is full.

If the fuel level sensor 39 senses that the fuel level in the fuel tank 25 is not full, the method proceeds to step S12 and the normally open electric fill stop valve remains open.

The fuel nozzle receptacle 29 can further include a receptacle sensor 31 configured to send a signal to the controller 27 whether the fuel nozzle 33 is received in the fuel nozzle receptacle, and the fuel system 21. In the method involving the normally open electric fill stop valve 37, a received signal can be sent, via the receptacle sensor 31, to the controller 27 indicating that the fuel nozzle 33 is received in the fuel nozzle receptacle 29, and a not-full signal can be sent, via the fuel level sensor, to the controller indicating that the fuel level is below full. The normally open electric fill stop valve 37 can be controlled, via the controller, to open in response to receipt of the not-full signal. When the fuel level in the fuel tank 25 is full, and the "close" signal is sent to the controller 27 via the fuel level sensor 39, the normally open electric fill stop valve 37 can be controlled, via the controller, to close in response to the "close" signal from the fuel level sensor that the fuel level is full, even if a fuel nozzle 33 is received in the fuel nozzle.

The fueling system 21 involving the normally open electric fill stop valve 37 can further comprise the fuel dispenser 35 comprising the fuel reservoir 49, the conduit 43, the fuel nozzle 33, and means for providing fuel from the reservoir through the conduit and to the fuel nozzle, such as the pump 45. The fuel dispenser 53 can comprise a dispenser controller 53 configured to communicate with the controller 27. In a method aspect of the invention, a do-not-dispense signal can be sent, via the controller 27, to the dispenser controller 53 when the "close" signal is sent to the controller, and the dispenser 35 can be controlled at step S11.2 so that the fuel providing means is prevented from providing fuel upon receipt of the do-not-dispense signal in response to the do-not-dispense signal.

When a not-full signal is sent, via the fuel level sensor 39, to the controller 27 indicating that the fuel level is below full, the normally open electric fill stop valve 37 can be controlled, via the controller, to open in response to receipt of the not-full signal. At the same time, the fuel providing means can be controlled at step S13.1, via the dispenser controller, to provide fuel upon receipt by the dispenser controller 53 of a signal indicating that the fuel nozzle 33 is received in the fuel nozzle receptacle 29 and that the fuel level is below full.

As with the fueling system having a normally closed electric fill stop valve, the fueling system 21 having the normally open electric fill stop valve 37 may further be considered to comprise the fuel dispenser 35 comprising the fuel reservoir 49, a conduit or dispenser hose 43, the fuel nozzle 33, and a pump 51 for pumping fuel from the reservoir through the conduit and to the fuel nozzle and a dispenser controller 53 that can be configured to communicate with the controller 27. The controller 27 can be configured to send a do-not-dispense signal to the dispenser controller 53 when a receptacle sensor senses that no fuel nozzle 33 is received in the fuel nozzle receptacle 29 at step S13 and sends the not-received signal to the controller and, at step S11.2, the dispenser 35 can be controlled by the dispenser controller 53 so that the pump 51 is prevented from pumping fuel upon receipt of the do-not-dispense signal. If it has been determined at step S11 that the fuel level is full, the dispenser controller 53 may additionally receive a signal indicating that the fuel level is full (meaning that the normally open electric fill stop valve 37 is closed) that can be used by the dispenser controller to prevent the pump 51 from pumping fuel. If, at step S12, the normally open electric fill stop valve is open, and (usually provided other conditions are met at step S2.5) at step S13, it is determined that the fuel nozzle 33 is received in the fuel nozzle receptacle 29, the fact that the normally open electric fill stop valve 37 is open and that the fuel level is not full can be communicated to the dispenser controller 53, and the dispenser controller can, at step S13.1 control the pump 51 to pump fuel. Signals indicating that the fuel nozzle 33 is received in the fuel nozzle receptacle 29 and that the fuel level is below full may be received by the fuel dispenser 53 directly from the receptacle sensor 31 and the fuel level sensor 39 or from the controller 27 that has received such signals from the receptacle sensor and the fuel level sensor.

A signal from any one of the receptacle sensor 31 at step S13 that the nozzle 33 is not properly received in the fuel nozzle receptacle, the fuel level sensor 39 at step S11 that the fuel tank is full, or that all non-fill related functions are not off at step S12.5 can individually be used to control the dispenser 35 to not dispense fuel at step S11.2 by the controller 27 sending control signals to the normally closed electric fill stop valve 37 and to the dispenser controller 53.

As with the system involving a normally closed electric ill stop valve, in the system involving a normally open electric fill stop valve, where the fueling system 21 comprises a pressure sensor 55 for sensing pressure in the fuel nozzle 33 and sending a pressure signal indicative of a pressure at the fuel nozzle to the dispenser controller (or the controller 27 and then to the dispenser controller), the method further can further comprise, at step S15, sending the pressure signal to the dispenser controller 53 and, if the dispenser controller determines that pressure is above or below predetermined levels, controlling, at step S13.2, via the dispenser controller, the pump 51 to adjust an amount of fuel pumped in response to the pressure signal, such as by reducing flow pumped by the fuel pump or stopping the fuel pump.

As with the system involving a normally closed electric fill stop valve, in the system involving a normally open electric fill stop valve, when the fueling system comprises a flow sensor 57 for sensing flow in the fuel nozzle 33 and sending a flow signal indicative of a flow at the fuel nozzle to the dispenser controller 53 (or to the controller 27 and then to the dispenser controller), the method further can comprise, at step S16, sending the flow signal to the dispenser controller and, if the dispenser controller determines that flow is above or below predetermined levels, controlling, at step S13.2, via the dispenser controller, the pump 51 to adjust an amount of fuel pumped in response to the flow signal, such as by reducing flow pumped by the fuel pump or stopping the fuel pump.

As with the system involving a normally closed electric fill stop valve, in the system involving a normally open electric fill stop valve, the method described in connection with the fueling system 21 shown in FIG. 1 is equally applicable to fueling systems having multiple fuel tanks as shown in FIG. 2. For example, the fueling dispenser 35 can be controlled to reduce (or, if appropriate) stop flow when a pressure or flow rate signal indicative of one of the tanks being full is received.

Normally Open or Normally Closed Electric Fill Valve

The fueling system 21 involving either the normally closed or the normally open electric fill stop valve can include a fuel dispenser 35 comprising a fuel reservoir 49, a conduit 43, a fuel nozzle 33, and means for providing fuel from the reservoir through the conduit and to the fuel nozzle, such as the fuel pump 51. The fuel dispenser 35 can comprise a dispenser controller configured to communicate with the controller, the controller being configured to send a do-not-dispense signal to the dispenser controller when the controller receives the signal that the fuel nozzle is not received in the fuel nozzle receptacle, and the dispenser controller being configured to prevent the fuel providing means from providing fuel upon receipt of the do-not-dispense signal. The controller 27 can be configured to permit the normally open or normally closed electric fill stop valve 37 to open when the controller receives a signal that the fuel nozzle 33 is received in the fuel nozzle receptacle 29 (where "permit" is used in the sense that the received signal satisfies one condition of at least one condition and potentially multiple conditions that must be satisfied for the controller to control the normally closed electric fill stop valve to open), and the controller can be configured to send a dispensing-permitted signal to the dispenser controller 53 when the receptacle sensor 31 sends a signal to the controller 27 that the fuel nozzle 33 is received in the fuel nozzle receptacle 29, and the dispenser controller can be configured to control the fuel providing means to provide fuel upon receipt of the dispensing permitted signal (where receipt of the dispensing-permitted signal by the dispenser controller satisfies one condition of at least one condition and potentially multiple conditions that must be satisfied for the dispenser controller to control the dispenser to dispense fuel).

The fueling system 21 involving either the normally closed or the normally open electric fill stop valve can include a pressure sensor 55 for sensing pressure in the fuel nozzle 33 and sending a pressure signal to the dispenser controller 53, and the dispenser controller can be configured to control the fuel providing means to adjust an amount of fuel provided in response to the pressure signal.

The fueling system 21 involving either the normally closed or the normally open electric fill stop valve can include a flow sensor 57 for sensing a fluid flow rate in the fuel nozzle 33 and sending a fluid flow rate signal to the dispenser controller 53, the dispenser controller being configured to control the fuel providing means to adjust an amount of fuel provided in response to the fluid flow rate signal.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A fueling system for an engine, comprising:
a fuel tank;
a fuel nozzle receptacle connected to the fuel tank;
a controller;
an electric fill stop valve disposed between the fuel nozzle receptacle and the fuel tank, the electric fill stop valve being configured to be controlled to open and close in response to a signal from the controller,
wherein the controller is configured to receive at least one of (a) a signal whether a fuel nozzle of a fuel dispenser is received in the fuel nozzle receptacle, and (b) a signal whether a fuel level of the fuel tank is full, and to control the electric fill stop valve to close when a signal is sent to the controller that at least one of (a) the fuel nozzle is not received in the fuel nozzle receptacle when the controller is configured to receive the signal whether the fuel nozzle of a fuel dispenser is received in the fuel nozzle receptacle, and (b) the fuel level of the fuel tank is full when the controller is configured to receive the signal whether the fuel level of the fuel tank is full, the fueling system comprising a locking mechanism on the fuel nozzle receptacle, the locking mechanism being linked to the controller and being controlled to permit the fuel nozzle to be received in the fuel nozzle receptacle when the engine and non-fill related functions are 'off' and fill related functions of the fueling system are "on" and preventing the fuel nozzle from being received in the fuel nozzle receptacle when the engine and non-fill related functions are "off" and fill related functions of the fueling system are off.

2. The fueling system as set forth in claim 1, wherein the fuel nozzle receptacle includes a receptacle sensor configured to send the signal to the controller whether the fuel nozzle is received in the fuel nozzle receptacle.

3. The fueling system as set forth in claim 1, wherein the controller is configured to control the electric fill stop valve to close when the controller receives the signal that the fuel nozzle is not received in the fuel nozzle receptacle.

4. The fueling system as set forth in claim 1, wherein the controller is configured to prevent operation of non-fill related functions of the engine when the controller receives a signal that the fuel nozzle is received in the fuel nozzle receptacle.

5. The fueling system as set forth in claim 4, wherein the controller is configured to stop operation of non-fill related functions of the engine when the controller receives the signal that the fuel nozzle is received in the fuel nozzle receptacle.

6. The fueling system as set forth in claim 4, wherein the controller is configured to operate non-fill related functions of the engine when at least one condition is satisfied, and wherein a condition of the at least one condition is satisfied when the controller receives a signal that the fuel nozzle is not received in the fuel nozzle receptacle.

7. The fueling system as set forth in claim 1, further comprising a second fuel tank, and a second electric fill stop valve between the second fuel tank and the fuel nozzle receptacle, the second electric fill stop valve being configured to be controlled to open and close in response to a signal from the controller.

8. The fueling system as set forth in claim 7, wherein the controller is configured to control the second electric fill stop valve to close when at least one condition is satisfied, and wherein a condition of the at least one condition is satisfied when the controller receives the signal that the fuel nozzle is not received in the fuel nozzle receptacle.

9. The fueling system as set forth in claim 7, further comprising a first fuel level sensor configured to sense a first fuel level in the first fuel tank and to send a signal to the controller indicative of whether the first fuel level is full, a second fuel level sensor configured to sense a second fuel level in the second fuel tank and to send a signal to the controller indicative of whether the second fuel level is full.

10. The fueling system as set forth in claim 9, wherein the first fuel level sensor is configured to send a signal to the controller that the first fuel level is full and the second fuel level sensor is configured to send a signal to the controller that the second fuel level is full, and wherein the controller is configured to control the first electric fill stop valve to close in response to the signal from the first fuel level sensor that the first fuel level is full, and to control the second electric fill stop valve to close in response to the signal from the second fuel level sensor that the second fuel level is full.

11. The fueling system as set forth in claim 9, wherein the first fuel level sensor is configured to send a signal to the controller that the first fuel level is below full and the second fuel level sensor is configured to send a signal to the controller that the second fuel level is below full, wherein the controller is configured to control the first electric fill stop valve to open when at least one first fuel tank condition is satisfied, and wherein a condition of the at least one first fuel tank condition is satisfied when the controller receives a signal that the first fuel level is below full, and wherein the controller is configured to control the second electric fill stop valve to open when at least one second fuel tank condition is satisfied, and wherein a condition of the at least one second fuel tank condition is satisfied when the controller receives a signal that the second fuel level is below full.

12. The fueling system as set forth in claim 9, wherein the first fuel level sensor is configured to send a signal to the controller that the first fuel level is below full and the second fuel level sensor is configured to send a signal to the controller that the second fuel level is below full, and wherein the controller is configured to control the first electric fill stop valve to open when the first fuel level sensor sends the signal to the controller indicating that the first fuel level is below full, and to control the second electric fill stop valve to open when the second fuel level sensor sends the signal to the controller indicating that the second fuel level is below full.

13. The fueling system as set forth in claim 9, wherein the first fuel level sensor is configured to send a signal to the controller that the first fuel level is below full and the second fuel level sensor is configured to send a signal to the controller that the second fuel level is below full, and wherein the controller is configured to control the first electric fill stop valve to open when (a) the controller receives a signal that the fuel nozzle is received in the fuel nozzle receptacle and (b) the first fuel level sensor sends the signal to the controller indicating that the first fuel level is below full, and to control the second electric fill stop valve to open when (a) the controller receives the signal that the fuel nozzle is received in the fuel nozzle receptacle and (b) the second fuel level sensor sends the signal to the controller indicating that the second fuel level is below full.

14. The fueling system as set forth in claim 1, further comprising a fuel level sensor in the fuel tank, the fuel level sensor being configured to sense a fuel level in the fuel tank and to send the signal to the controller whether the fuel level is full.

15. The fueling system as set forth in claim 14, wherein the fuel level sensor is configured to send a signal to the controller that the fuel level is below full, and wherein the controller is configured to control the electric fill stop valve to open when at least one condition is satisfied, and wherein a condition of the at least one condition is satisfied when the fuel level sensor sends the signal to the controller indicating that the fuel level is below full.

16. The fueling system as set h in claim 14, wherein the fuel level sensor is configured to send a signal to the controller that the fuel level is below full, and the controller is configured to control the electric fill stop valve to open when the fuel level sensor sends the signal to the controller indicating that the fuel level is below full.

17. The fueling system as set forth in claim 14, wherein the fuel level sensor is configured to send a signal to the controller that the fuel level is full, and the controller is configured to control the electric fill stop valve to close when the fuel level sensor sends the signal to the controller indicating that the fuel level is full.

18. The fueling system as set forth in claim 14, further comprising a fuel dispenser comprising a fuel reservoir, a conduit, a fuel nozzle, and means for providing fuel from the reservoir through the conduit and to the fuel nozzle, the fuel dispenser comprising a dispenser controller configured to communicate with the controller, wherein the fuel level sensor is configured to send a signal to the controller that the fuel level is full, and the controller is configured to send a do-not-dispense signal to the dispenser controller when the controller receives the signal that the fuel level is full, and the dispenser controller being configured to prevent the fuel providing means from providing fuel upon receipt of the do-not-dispense signal.

19. The fueling system as set forth in claim 18, wherein the fuel level sensor is configured to send a signal to the controller that the fuel level is below full, and wherein the controller is configured to control the electric fill stop valve to open when at least one condition is satisfied, and wherein a condition of the at least one condition is satisfied when the controller receives a signal that the fuel level is below full, the controller being configured to send a dispensing-permitted signal to the dispenser controller when the receptacle sensor sends a signal to the controller that the fuel nozzle is received in the fuel nozzle receptacle, and the dispenser controller being configured to control the fuel providing means to provide fuel upon receipt of the dispensing permitted signal.

20. The fueling system as set forth in claim 1, further comprising a fuel dispenser comprising a fuel reservoir, a conduit, a fuel nozzle, and means for providing fuel from the reservoir through the conduit and to the fuel nozzle, the fuel dispenser comprising a dispenser controller configured to communicate with the controller, the controller being configured to send a do-not-dispense signal to the dispenser controller when the controller receives the signal that the fuel nozzle is not received in the fuel nozzle receptacle, and the dispenser controller being configured to prevent the fuel providing means from providing fuel upon receipt of the do-not-dispense signal.

21. The fueling system as set forth in claim 20, wherein the controller is configured to control the electric fill stop valve to open when at least one condition is satisfied, and wherein a condition of the at least one condition is satisfied when the controller receives a signal that the fuel nozzle is received in the fuel nozzle receptacle, the controller being configured to send a dispensing-permitted signal to the dispenser controller when the receptacle sensor sends a signal to the controller that the fuel nozzle is received in the fuel nozzle receptacle, and the dispenser controller being configured to control the fuel providing means to provide fuel upon receipt of the dispensing permitted signal.

22. The fueling system as set forth in claim 1, further comprising a fuel dispenser comprising a fuel reservoir, a conduit, a fuel nozzle, means for providing fuel from the reservoir through the conduit and to the fuel nozzle, a dispenser controller, and a pressure sensor for sensing pressure in the fuel nozzle and sending a pressure signal to the dispenser controller, the dispenser controller being configured to control the fuel providing means to adjust an amount of fuel provided in response to the pressure signal.

23. The fueling system as set forth in claim 1, further comprising a fuel dispenser comprising a fuel reservoir, a conduit, a fuel nozzle, means for providing fuel from the reservoir through the conduit and to the fuel nozzle, a dispenser controller, and a flow sensor for sensing a fluid flow rate in the fuel nozzle and sending a fluid flow rate signal to the dispenser controller, the dispenser controller being configured to control the fuel providing means to adjust an amount of fuel provided in response to the fluid flow rate signal.

24. A fueling system for an engine, comprising:
a fuel tank:
a fuel nozzle receptacle connected to the fuel tank;
a controller;
an electric fill stop valve disposed between the fuel nozzle receptacle and the fuel tank, the electric fill stop valve being configured to be controlled to open and close in response to a signal from the controller,
wherein the controller is configured to receive at least one of (a) a signal whether a fuel nozzle of a fuel dispenser is received in the fuel nozzle receptacle, and (b) a signal whether a fuel level of the fuel tank is full, and to control the electric fill stop valve to close when a signal is sent to the controller that at least one of (a) the fuel nozzle is not received in the fuel nozzle receptacle when the controller is configured to receive the signal whether the fuel nozzle of a fuel dispenser is received in the fuel nozzle receptacle, and (b) the fuel level of the fuel tank is full when the controller is configured to receive the signal whether the fuel level of the fuel tank is full, wherein the controller is configured to control the electric fill stop valve to open when at least one condition is satisfied, and wherein a condition of the at least one condition is satisfied when the controller receives a signal that the fuel nozzle is received in the fuel nozzle receptacle.

25. The fueling system as set forth in claim 24, further comprising a fuel level sensor in the fuel tank, the fuel level sensor being configured to sense a fuel level in the fuel tank and to send the signal to the controller whether the fuel level is full.

26. The fueling system as set forth in claim 25, wherein the controller is configured to control the electric fill stop valve to open when the controller receives a signal that the fuel nozzle is received in the fuel nozzle receptacle and the fuel level sensor sends a signal to the controller indicating that the fuel level is below full.

27. The fueling system as set forth in claim 25, wherein the controller is configured to control the electric fill stop valve to close when the controller receives a signal that the fuel nozzle is received in the fuel nozzle receptacle and the fuel level sensor sends a signal to the controller indicating that the fuel level is full.

28. The fueling system as set forth in claim 25, wherein the controller is configured to control the electric fill stop valve to open when the controller receives the signal that the fuel nozzle is not received in the fuel nozzle receptacle and the fuel level sensor sends a signal to the controller indicating that the fuel level is below full.

29. The fueling system as set forth in claim 25, wherein the controller is configured to control the electric fill stop valve to close when the receptacle sensor sends the signal to the controller that the fuel nozzle is not received in the fuel nozzle receptacle and the fuel level sensor sends a signal to the controller indicating that the fuel level is full.

30. A method for fueling a pressurized feet fueling system for an engine, the fueling system comprising a fuel tank, a fuel nozzle receptacle connected to the fuel tank, a controller, and an electric fill stop valve disposed between the fuel nozzle receptacle and the fuel tank, the electric fill stop valve being configured to be controlled to open and close in response to a signal from the controller, comprising
sending a close signal to the controller when at least one of
a fuel nozzle is not received in the fuel nozzle receptacle, and
a fuel level in the fuel tank is full; and
controlling, via the controller, the electric fill stop valve to close when the close signal is sent to the controller; and
controlling, via the controller, a locking mechanism on the fuel nozzle receptacle, to permit the fuel nozzle to be received in the fuel nozzle receptacle when the engine and non-fill related functions are "off" and fill related functions of the fueling system are "on" and to prevent the fuel nozzle from being received in the fuel nozzle receptacle when the engine and non-fill related functions are "oft" and fill related functions of the fueling system are off.

31. The method as set forth in claim 30, comprising
sending a signal to the controller indicating that the fuel nozzle is received in the fuel nozzle receptacle, and
controlling, via the controller, the electric fill stop valve to open when at least one condition is satisfied, a condition of the at least one condition being that the received signal is sent to the controller.

32. The method as set forth in claim 30, wherein the fuel nozzle receptacle includes a receptacle sensor, comprising sending via the receptacle sensor a signal to the controller whether the fuel nozzle is received in the fuel nozzle receptacle.

33. The method as set forth in claim 30, wherein the fuel system further comprises a fuel level sensor configured to sense a fuel level in the fuel tank, comprising sending via the fuel level sensor a signal to the controller indicative of whether the fuel level is full.

34. The method as set forth in claim 33, wherein the signal to the controller indicative of whether the fuel level is full is the close signal when the fuel level in the fuel tank is full, the method comprising
sending the close signal to the controller, and
controlling, via the controller, the electric fill stop valve to close in response to the close signal from the fuel level sensor that the fuel level is full.

35. The method as set forth in claim 30, wherein the fuel nozzle receptacle includes a receptacle sensor configured to send a signal to the controller whether the fuel nozzle is received in the fuel nozzle receptacle, and the fuel system further comprises a fuel level sensor configured to sense a fuel level in the fuel tank and to send a signal to the controller indicative of whether the fuel level is full, the method comprising
sending, via the receptacle sensor, a received signal to the controller indicating that the fuel nozzle is received in the fuel nozzle receptacle, and
sending, via the fuel level sensor, a not-full signal to the controller indicating that the fuel level is below full, and
controlling, via the controller, the electric fill stop valve to open in response to receipt of both the received signal and the not-full signal.

36. The method as set forth in claim 30, wherein the fueling system further comprises a fuel dispenser comprising a fuel reservoir, a conduit, a fuel nozzle, and means for providing fuel from the reservoir through the conduit and to the fuel nozzle, the fuel dispenser comprising a dispenser controller configured to communicate with the controller, comprising:
sending, via the controller, a do-not-dispense signal to the dispenser controller when the close signal is sent to the controller, and
controlling the dispenser so that the fuel providing means is prevented from providing fuel upon receipt of the do-not-dispense signal in response to the do-not-dispense signal.

37. The method as set forth in claim 36, wherein the fuel nozzle receptacle includes a receptacle sensor configured to send a signal to the controller whether the fuel nozzle is received in the fuel nozzle receptacle, and the fuel system further comprises a fuel level sensor configured to sense a fuel level in the fuel tank and to send a signal to the controller indicative of whether the fuel level is full, the method comprising
sending, via the receptacle sensor, a received signal to the controller indicating that the fuel nozzle is received in the fuel nozzle receptacle,
sending, via the fuel level sensor, a not-full signal to the controller indicating that the fuel level is below full,
controlling, via the controller, the electric fill stop valve to open in response to receipt of both the received signal and the not-full signal, and
controlling, via the dispenser controller, the fuel providing means to provide fuel upon receipt by the dispenser controller of a signal indicating that the fuel nozzle is received in the fuel nozzle receptacle and that the fuel level is below full.

38. The method as set forth in claim 30, wherein the fueling system further comprises a fuel dispenser comprising a fuel reservoir, a conduit, a fuel nozzle, means for providing fuel from the reservoir through the conduit and to the fuel nozzle, a dispenser controller, and a pressure sensor for sensing pressure in the fuel nozzle and sending a pressure signal indicative of a pressure at the fuel nozzle to the dispenser controller, the method comprising
sending the pressure signal to the dispenser controller; and
controlling, via the dispenser controller, the fuel providing means to adjust an amount of fuel provided in response to the pressure signal.

39. The method as set forth in claim 30, wherein the fueling system further comprises a fuel dispenser comprising a fuel reservoir, a conduit, a fuel nozzle, means for providing fuel from the reservoir through the conduit and to the fuel nozzle, a dispenser controller, and a flow sensor for sensing flow in the fuel nozzle and sending a flow signal indicative of a flow at the fuel nozzle to the dispenser controller, the method comprising
sending the flow signal to the dispenser controller; and
controlling, via the dispenser controller, the fuel providing means to adjust an amount of fuel provided in response to the flow signal.

* * * * *